United States Patent
Williams et al.

(10) Patent No.: US 12,510,757 B2
(45) Date of Patent: Dec. 30, 2025

(54) ELECTRONIC DEVICE WITH FORWARD ARM JOINT

(71) Applicant: Apple Inc., Cupertino, CA (US)

(72) Inventors: Paul Williams, Seattle, WA (US); Alison B. Shutzberg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/615,559

(22) Filed: Mar. 25, 2024

(65) Prior Publication Data

US 2025/0085555 A1    Mar. 13, 2025

Related U.S. Application Data

(60) Provisional application No. 63/581,942, filed on Sep. 11, 2023.

(51) Int. Cl.
*G02B 27/01* (2006.01)

(52) U.S. Cl.
CPC .............................. *G02B 27/0176* (2013.01)

(58) Field of Classification Search
None
See application file for complete search history.

(56) References Cited

U.S. PATENT DOCUMENTS

| | | | | |
|---|---|---|---|---|
| 9,482,883 B1* | 11/2016 | Meisenholder | ........ | G02C 5/146 |
| 9,740,023 B1* | 8/2017 | Ashwood | ................ | G02C 5/14 |
| 9,851,585 B2* | 12/2017 | Ashwood | ............... | G02C 5/001 |
| 10,732,415 B2* | 8/2020 | Amitai | ................. | G02B 27/283 |
| 11,726,335 B2* | 8/2023 | Harder | ................... | G09G 3/001 |
| | | | | 345/7 |
| 2009/0296044 A1* | 12/2009 | Howell | ................... | G02C 11/10 |
| | | | | 351/158 |
| 2013/0201438 A1* | 8/2013 | Gasparetto | ............... | G02C 5/22 |
| | | | | 351/178 |
| 2019/0150731 A1* | 5/2019 | Eberl | ........................ | G09G 5/00 |
| 2021/0026139 A1* | 1/2021 | Harder | ............... | G02B 27/0172 |
| 2021/0103146 A1* | 4/2021 | Travers | ................... | G06F 3/016 |
| 2023/0305301 A1* | 9/2023 | Kasar | ..................... | G02C 5/001 |
| 2024/0192508 A1* | 6/2024 | Chen | ................. | G02B 27/0172 |

* cited by examiner

*Primary Examiner* — Dorothy Harris
(74) *Attorney, Agent, or Firm* — Dorsey & Whitney LLP

(57) ABSTRACT

A head mountable electronic device can include a display frame, a display window secured to the display frame, and a fixed portion extending distally from the display frame, the fixed portion including a proximal end adjacent the display window, a distal end opposite the proximal end, and an electronic component. The head mountable electronic device can also include a securement arm, the securement arm including a hinge segment rotatably coupling the securement arm with the proximal end of the fixed portion and an elongated member extending distally from the hinge.

20 Claims, 7 Drawing Sheets

ELECTRONIC DEVICE WITH FORWARD ARM JOINT

CROSS REFERENCE TO RELATED APPLICATIONS

This application claims the benefit of priority to U.S. Provisional Patent Application No. 63/581,942, filed 11 Sep. 2023, and entitled "ELECTRONIC DEVICE WITH FORWARD ARM JOINT," the disclosure of which is hereby incorporated by reference in its entirety.

FIELD

The described embodiments relate generally to electronic devices. More particularly, the described embodiments relate to head mountable electronic devices.

BACKGROUND

Recent advances in portable computing have enabled head-mountable devices, or electronic devices that are worn on a user's head, which provide augmented and virtual reality experiences to users. Various component of these devices, such as display screens, viewing frames, securement arms, speakers, batteries, and other components, operate together to provide an immersive and comfortable experience. The various electronic components can require various arrangements relative to other features of the head mountable devices, limiting the possible configurations of the components of the device.

Further, the anatomy of each user's head is unique. One user's head can be larger than another user's head, or one head can be a different shape. Other anatomical features, including relative positions of a user's nose, forehead, and ears, can vary widely between users as well. The anatomical variety of heads presents a challenge for head-mountable devices designed for comfort and reliability. In some head-mountable devices, for example, securement arms that extend along, or make contact with, opposing sides of a user's head can be used to secure the device to the user's head. However, the dimensions, angles, shape, positions, and other physical characteristics of the arms that can be sufficient to comfortably and reliably secure the device to one user's head may not be sufficient to comfortably and reliably secure the device to another user's head.

Additionally, head-mountable devices can be used in a variety of different settings and during a variety of different activities, as well as in a variety of different orientations. For example, a user can use the head-mountable devices during formal or public settings such as work or during social engagements, or for private use at home. However, existing head mountable devices are often bulky or aesthetically displeasing. The bulky nature of the devices can limit the environments or activities that a user can acceptably use the device. Further, poor aesthetics of existing devices can discourage widespread use in public or social settings.

Accordingly, what is needed in the art are head-mountable devices and systems accommodating users having a wide variety of anatomical features and who participate in a wide variety of activities with comfortable and reliable components.

SUMMARY

In at least one example of the present disclosure, a head mountable electronic device can include a display frame, a display window secured to the display frame, and a fixed portion extending distally from the display frame, the fixed portion including a proximal end adjacent the display window, a distal end opposite the proximal end, and an electronic component. The head mountable electronic device can also include a securement arm, the securement arm including a hinge segment rotatably coupling the securement arm with the proximal end of the fixed portion and an elongated member extending distally from the hinge.

In another example of the head mountable electronic device, the electronic component can include a projector. In another example of the head mountable electronic device, the projector can be fixed in position relative to the display window. In another example of the head mountable electronic device, the head mountable electronic device can further include a first joint defining a connection between the fixed portion and the hinge segment and a biasing member, wherein the biasing member includes a torsion spring and the biasing member is engaged with the hinge segment and the fixed portion at the first joint. In another example of the head mountable electronic device, the head mountable electronic device can further include a first joint defining a connection between the fixed portion and the hinge segment and a biasing member, wherein the biasing member includes a cantilever and the biasing member is engaged with the hinge segment and the fixed portion at the first joint. In another example of the head mountable electronic device, the head mountable electronic device can further include a second joint rotatably connecting the elongated member and the hinge segment. In another example of the head mountable electronic device, the hinge segment can include a first exterior arm surface, the elongated member can include a second exterior arm surface, and the hinge and elongated member abut to align the first exterior arm surface and the second exterior arm surface.

In at least one example of the present disclosure, an optical electronic device can include a frame including a transparent window, a fixed portion extending from the frame, the fixed portion defining a connection aperture and including a waveguide configured to direct light displayed at the transparent window, a securement arm extending distally from the frame, the securement arm including a bracket segment rotatably engaged with the fixed portion at the connection aperture and extending along a length of the fixed portion and an elongated member rotatably coupled to the bracket segment, and a deflector engaged with the bracket segment and the fixed portion.

In another example of the optical electronic device, the fixed portion can include a top side and a bottom side opposite the top side, the bracket segment can include one or more beams, and the one or more beams extend along a portion of the top side and the bottom side. In another example of the optical electronic device the fixed portion can include an interior side adjacent the display window and an exterior side opposite the interior side, the bracket can include one or more beams, and the one or more beams cover a portion of the exterior side of the fixed portion. In another example of the optical electronic device, the fixed portion can include a top side, a bottom side opposite the top side, an interior side adjacent the display window, and an exterior side opposite the interior side, the bracket segment can include one or more beams, and the one or more beams cover a portion of the exterior side, the top side, and the bottom side. In another example of the optical electronic device, the optical electronic device can include a fastener, the bracket defines a securement aperture aligned with the connection aperture, and the fastener couples the bracket and the fixed portion at the connection aperture and the securement aperture. In another example of the optical electronic device, the fastener can define a rotatable pivot.

In at least one example of the present disclosure, an electronic device can include a frame, a viewing window secured to the frame, an electronic housing portion, the electronic housing portion including a projector fixed within the electronic housing portion, a securement arm rotatably extending distally to the electronic housing portion, the securement arm including a proximal portion rotatably engaged with the electronic housing portion at a joint and a distal portion opposite the proximal portion, and a flexible member coupled to the electronic housing portion and engaged with the securement arm, the flexible member extending across the joint.

In another example of the electronic device, the electronic housing portion can include a proximal end extending from the frame and a distal end opposite the proximal end, and the proximal portion is coupled to the distal end at the joint. In another example of the electronic device, the electronic housing portion can include an exterior side opposite the viewing window, and the flexible member extends across the joint and along a length of the exterior side of the electronic housing portion and a length of the proximal portion of the securement arm. In another example of the electronic device, the electronic housing portion can include a proximal end extending from the viewing frame and a distal end opposite the proximal end, and the proximal portion of the securement arm is coupled to the proximal end. In another example of the electronic device, the flexible member can include an inward deflecting cantilever. In another example of the electronic device, the flexible member can include an inward deflecting spring. In another example of the electronic device, the electronic housing portion can include an exterior side opposite the viewing window and a recess defined by the exterior side, and the flexible member is positioned in the recess.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
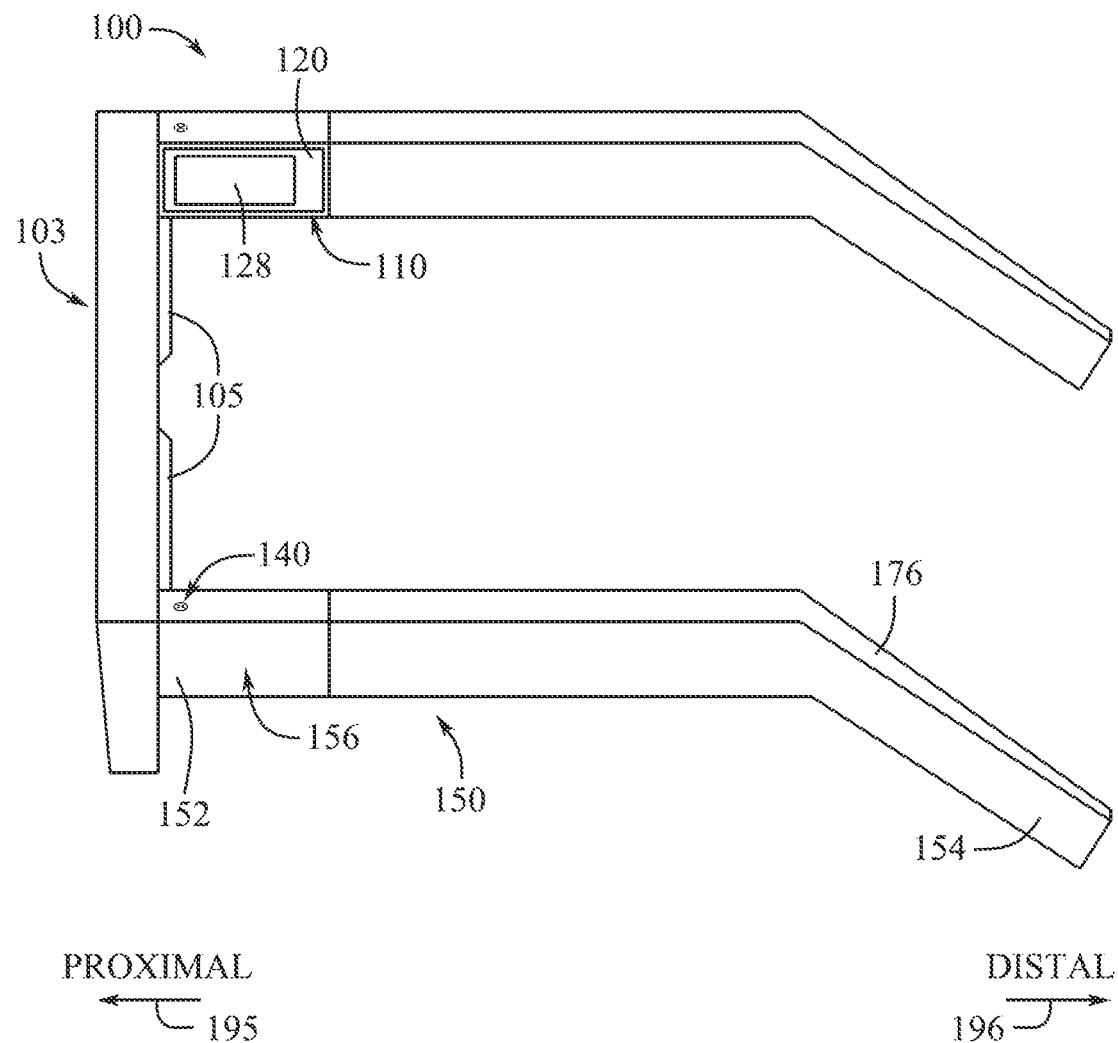
FIG. 1A shows a top perspective view of an example of a head mountable electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to electronic devices. More particularly, the present disclosure relates to head-mountable electronic devices having securement arms. In at least one example, a head-mountable device can include a viewing or display frame and a securement arm extending from the viewing frame. An electronic component housing can be coupled to or extend from the viewing frame.

Examples of head-mountable electronic devices can include virtual reality or augmented reality devices that include an optical component. In the case of augmented reality devices, optical eyeglasses or frames can be worn on the head of a user such that optical windows, which can include transparent windows, lenses, or displays, can be positioned in front of the user's eyes. In another example, a virtual reality device can be worn on the head of a user such that a display screen is positioned in front of the user's eyes. The viewing frame can include a housing or other structural components supporting the optical components, for example lenses or screens, or various electronic components.

The optical electronic device can include one or more electronic components used to operate the head-mountable electronic device. These components can include any components used by the head-mountable electronic device to produce a virtual or augmented reality experience. For example, electronic components can include one or more projectors, waveguides, speakers, processors, batteries, circuitry components including wires and circuit boards, or any other electronic components used in the head-mountable device to deliver augmented or virtual reality visuals, sounds, and other outputs. The various electronic components can be disposed within the electronic component housing. In some examples, the various electronic components can be disposed with in or attached to one or more of the display frame, the electronic component housing, or the securement arm.

In some examples, the electronic components can be positioned or require a defined relationship relative to another component of the head-mountable electronic device. For example, the electronic components can include a projector and/or a waveguide. The projector or waveguide can be calibrated to generate an image size or quality corresponding to a distance or orientation between the projector and the windows of the display frame. Accordingly, the projector can be attached or positioned to limit movement relative to the lenses during use. In some examples, electrical components such as a speaker, can similarly require a defined position relative to another component of the head mountable device or the user's head.

Head-mountable electronic devices, such as head-mountable optical devices, smart glasses, and so forth, which can deliver virtual and augmented reality experiences, can be used in a variety of different settings and during a variety of activities. For example, a user can utilize head mountable devices during work or formal events. In other examples, a user can use head mountable devices during physical activities whether indoors, such as at a gym, or outdoors during activities like hiking, biking, or running. The devices of the present disclosure include components, such as securement arms, which can be adapted to comfortably secure head-mountable devices to the user during the various activities in which the user participates. Further, the components can be structured to be aesthetically appealing or acceptable for the variety of activities engaged in by a user.

In addition, the head measurements and anatomical features of each user can vary such that a securement arm of the same fixed length or shape and orientation may not be appropriate for every user. For example, some heads are rounder than others. Some heads are larger or smaller and the position of a user's nose relative to their eyes can vary. The position of a user's cars relative to their nose or forehead can vary from one user to another such that an arrangement of securement arms that effectively secure a head-mountable device to one user do not effectively secure the same device to another user. To accommodate the various head shapes and sizes of the users, the head mountable device can include adjustably positionable components, such as the securement arms.

Examples of head mountable devices of the present disclosure can include an electronics housing attached to or extending from the viewing frame. The electronics housing can extend distally relative to the viewing frame. The electronics housing portion can include or house one or more of the electronic components of the head mountable device. The electronics housing portion can be fixed in position relative to the viewing frame, or a component of the viewing frame such as the display windows. By fixing the electronics housing relative to the display frame, the orientation of the electronics components stored in the electronics housing can also be fixed. By fixing the electronics components relative to the display frame to limit the quality of a projector image can be improved or the frequency of calibration can be reduced.

The head mountable devices can include two or more securement arms. The securement arms can be coupled to the viewing frame or electronics housing. For example, the securement arms can be coupled at or adjacent the viewing frame. The securement arms can extend distally relative to the viewing frame. In some examples, the securement arms can rotatably couple to the electronics housing, such as at a joint or pivot. In one example, the securement arms are rotatably coupled to a proximal portion of the electronics housing adjacent the viewing frame. In other examples, the securement arms can rotatably couple to a distal portion of the electronics housing. The rotation of the securement arms about the joint or pivot can allow a user to adjust the head mountable device to fit the width or size of their head. The adjustability of the securement arms can allow the same size of a head mountable device to be used by a variety of users having differently sized heads or facial features.

The securement arms can include a bracket or hinge segment coupled to the electronics housing and an elongated member extending distally from the hinge segment. The bracket or hinge segment can be included a proximal portion of the securement arms. The joint can define a connection between the electronics housing and the hinge segment. The elongated member can be attached to a distal end of the hinge segment. In some examples, the elongated member is connected to the hinge segment by a second joint. The second joint can allow rotation of the elongated member. For example, the elongated member can rotate or fold inward relative to the hinge segment or electronics housing to provide the head mountable device in a compact configuration for storage.

In examples where the securement arms connect to the electronics housing, the hinge segment can extend along, cover a portion of, or be coupled to the electronic housing. For example, the hinge segment can include one or more beams extending along a side of the electronics housing. In some examples, the beam can extend along an exterior side of the securement arm or electronics housing. The beam can extend along a top or a bottom of the electronics housing. When the securement arms are rotated about the joint the hinge segment can create the appearance of a continuous arm extending from the viewing frame by covering or concealing a portion of the electronics housing. The continuous appearing securement arm can be more aesthetically pleasing and suitable for common use of the head mountable device. The hinge segment can prevent debris or moisture from entering the electronics housing. The hinge segment can also be arranged to limit or reduce the height or width of the combined securement arms and electronics housing. The reduced combined size can be aesthetically pleasing to users.

In some examples, the head mountable device can include a flexible or biasing member. The flexible member can assist in positioning the securement arm or creating the appearance of a continuous securement arm. The flexible member can be an elastically deformable material or component. For example, the flexible member can be a torsional spring or a cantilever feature to bias the securement arm inward. When the head mountable device is worn by a user, biasing the securement arms inward can assist in compressing the securement arms against a user's head to provide a more secure fit. The flexible member can be positioned or arranged on the interior of the hinge segment or electronics housing, or between components. For example, the flexible member can be coupled to a pivot or fastener of a joint. The flexible member can be positioned or arranged along an exterior side of the securement arms and/or the electronics housing. The flexible member can assist in creating a continuous securement arm appearance. For example, the securement arm can be coupled to a distal end of the electronics housing and the flexible member can extend along the electronics housing and the securement arm. The flexible member can conceal or cover a joint between the securement arm and electronics housing to reduce the appearance of a bend at the joint. Minimizing the bend can provide a more pleasing aesthetic to the head mountable device.

In the foregoing examples, and those described hereafter, the hinges, securement arms, fixed and rotatable portions, and other components of the electronic devices can be arranged to present an aesthetically appealing form. This can include a moveable securement arm integrated with a fixed electronic component portion, which can move for user adjustment and securement without presenting a broken or segmented appearance along an outer surface of the securement arm, for example where the electronic component portion is located. This pleasing, continuous appearance can be achieved in the described examples without affecting the fixed position of electronic components such as projectors and waveguides.

These and other embodiments are discussed below with reference to FIGS. 1-4B. However, those skilled in the art will readily appreciate that the detailed description given herein with respect to these Figures is for explanatory purposes only and should not be construed as limiting.

Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A illustrates a top perspective view of an example wearable device, for example a head mountable device 100. The head mountable device 100 can include a viewing or display frame 103. The display frame 103 can be configured to position one or more viewing windows 105, for example optically transparent windows, lenses, or display screens (shown in FIG. 1B), in front of the eyes or face of the user. The optically transparent window allows at least some visible light to pass from one side of the viewing windows 105 to the other side, allowing a user to see objects through the window 105.

The head mountable device 100 can include an electronics housing portion 110 extending from or connected to the display frame 103. The electronic components 128 can include speakers, projectors, waveguides, and other various components. In examples where the electronic components 128 include a projector or a waveguide, the projector can be configured to project light displayed at, on, or in the window 105 and the waveguide can be configured to guide light displayed at, on, or in the window 105. For example, the device 100 can include electronic components 128 to produce a virtual or augmented reality experience, or otherwise generate images that are displayed on the display screen or windows 105. For example, the electronic components 128 can include one or more projectors, screens, lighting devices, speakers, processors, batteries, circuitry components including wires and circuit boards, or any other electronic components used in the head-mountable device 100 to deliver augmented or virtual reality visuals, sounds, and other outputs. The electronic components 128 can be disposed within the display frame 103, the electronics housing 110, or securement arms 150. One or more electronic components 128 can be attached to or positioned within the electronics housing 110. In some examples, the electronic components 128 can be exposed on or accessible from an interior side 120 of the electronics housing 110.

The head mountable device 100 can also include one or more securement arms 150. The securement arms 150 can include a hinge segment 156 oriented towards the proximal direction 195. The hinge segment 156 can define or include the proximal portion or side 152 of the securement arms 150. The hinge segment 156 can be arranged to rotatably couple to the display frame 103 or the electronics housing 110. The securement arms 150 can include an elongated member 176. The elongated member 176 can extend from or couple to the hinge segment 156. In one example, the elongated member 176 extends in the distal direction 196 from the hinge segment 156. The elongated member 176 can define or include the distal portion or side 154 of the securement arms 150, opposite the proximal end. The elongated member 176 can be arranged to rest on a user's ears or contact the side of the user's head to secure the head mountable device 100 to the user.

The securement arms 150 can connect or attach to the electronics housing 110 or the display frame 103. The head mountable device 100 can include a joint 140, which can be a first joint 140. The joint 140 can define a connection between the electronics housing 110 and the hinge segment 156. For example, the hinge segment 156 can couple to the electronics housing 110 adjacent the display frame 103. The securement arms 150 can be rotatable about the first joint 140 to accommodate various head sizes. The securement arms 150 can extend in the distal direction 196 from the joint 140 relative to the display frame 103.

When coupled, the hinge segment 156 can cover a portion of or extend along a side of the electronics housing 110. For example, as shown in FIG. 1A, the electronics housing 110 can nest within the hinge segment 156. The nesting relationship can conceal or protect the electronics housing 110. The nesting relationship can also act to create an appearance of the securement arms 150 and electronic housing 110 as extending from the display frame 103 as a single object, increasing the aesthetic appeal of the device 100.

Figure 1B:
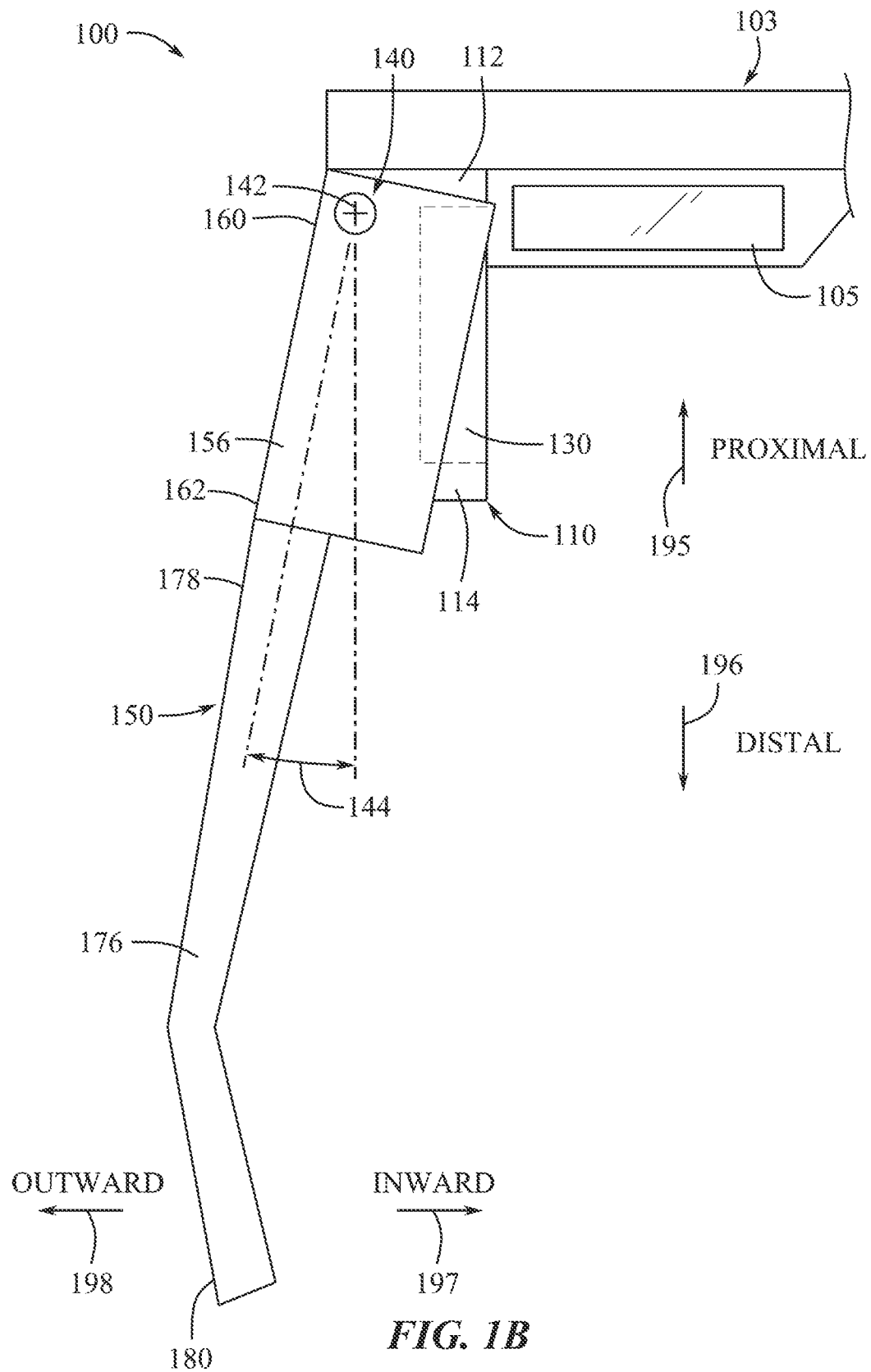
FIG. 1B shows a partial plan view of the example head mountable electronic device of FIG. 1A.

FIG. 1B illustrates a rear top perspective view of a portion of the example device 100 of FIG. 1A. As described above, the head mountable device 100 can include a display frame including viewing windows 105.

The electronics housing portion 110 can extend from the display frame 103 in the distal direction 196. The electronics housing portion 110 can be positioned in the outward direction 198 relative to the viewing windows 105. The electronics housing portion 110 can include a proximal end 112 and a distal end 114, opposite the proximal end 112. The proximal end 112 can extend from or connect to the display frame 103. The electronics housing 110 can be fixed in position relative to or rigidly connected to the display frame 103. As discussed above, the electronic components 128 in the electronics housing 110 can be a projector 130. The projector 130 can produce an image displayable at the viewing window 105. The projector 130 can require a defined or consistent position relative to the viewing window 105 or display frame 103 to produce images at the viewing window 105. For example, the projector 130 can be calibrated to produce a size of an image based off the distance or angle relative to the viewing windows 105. In one example, the projector 130 can be positioned towards the interior or inward direction 197 of the electronics housing 110. The fixed position of the electronics housing 110 relative to the display frame can maintain the positioning of the projector 130 relative to the windows 105. For example, the fixed position of the electronics housing 110 can fix the position of the projector 130 relative to the viewing window 105.

The securement arms 150 can include the hinge segment 156 and the elongated member 176. The hinge segment 156 can include a proximal end 160 towards the proximal direction 195 and a distal end 162, opposite the proximal end 160 and towards the distal direction 196. The elongated member 176 can include a proximal end 178 towards the proximal direction 195, and a distal end 180, opposite the proximal end 160 and towards the distal direction 196. The proximal end 178 of the elongated member 176 can couple to or extend from the distal end 162 of the hinge segment 156. The elongated member 176 and the hinge segment 156 can be rotatably connected at a second joint 146 (shown in FIG. 1E). The proximal end 160 of the hinge segment 156 can correspond to the proximal side 152 of the securement arms 150. The distal end 180 of the elongated member 176 can correspond to the distal side 154 of the securement arms 150.

The securement arms 150 can be coupled to or adjacent the display frame 103. As discussed above, the securement arms 150 can couple to the electronics housing 110. The joint 140 can define the connection between the securement arms 150 and the electronics housing 110. The joint 140 can be positioned adjacent the display frame 103. The joint 140 can include a fastener 142 (e.g. screw, bolt, pin) or similar structure to rotatably couple the securement arms 150 to the electronics housing 110. The securement arms 150 and the electronic housing 110 can define corresponding apertures (shown in FIG. 1C) to receive the fastener 142. By positioning the joint 140 adjacent the display frame 103, the securement arm 150 can be positioned adjacent to the display frame 103. Accordingly, the proximal end 160 of the hinge segment 156 can be positioned adjacent to the display frame 103. In some examples, the joint 140 can connect the proximal end 160 of the hinge segment 156 to the proximal end 112 of the electronics housing 110. The securement arms 150 can be positioned or arranged to cover all or a portion of the electronics housing 110. For example, the hinge segment 156 can cover a portion of the electronics housing 110 facing the outward direction.

During use, the securement arms 150 can rotate about the joint 140. The difference in position between a resting configuration of the securement arms 150 and a rotated position of the securement arms 150 can define the splay angle 144. The display frame 103 and the securement arms 150 can generally be arranged to fit a user's head by allowing rotation of the securement arms 150 about the joint 140 in the outward direction 198. In some examples, the display frame 103 and the electronics housing 110 can be arranged to allow rotation of the securement arm 150 in the inward direction 197 about the joint 140. During rotation about the joint 140, the hinge segment 156 and the elongated member 176 can maintain a similar configuration relative to one another. Accordingly, the securement arms 150 can appear to extend as a single feature from the joint 140, which can be an aesthetically appealing configuration. The electronic housing 110 can remain fixed in position to the display frame 103 during rotation of the securement arms 150. Accordingly, the projector 130 can maintain a spacing or orientation with the viewing windows 105 while also accommodating various head sizes of users. The securement arms 150 can cover a portion of the electronic housing 110 to create the appearance the electronic housing 110 also rotates or to hide the electronic housing 110 during rotation to improve the aesthetic appearance of the device 100.

Figure 1C:
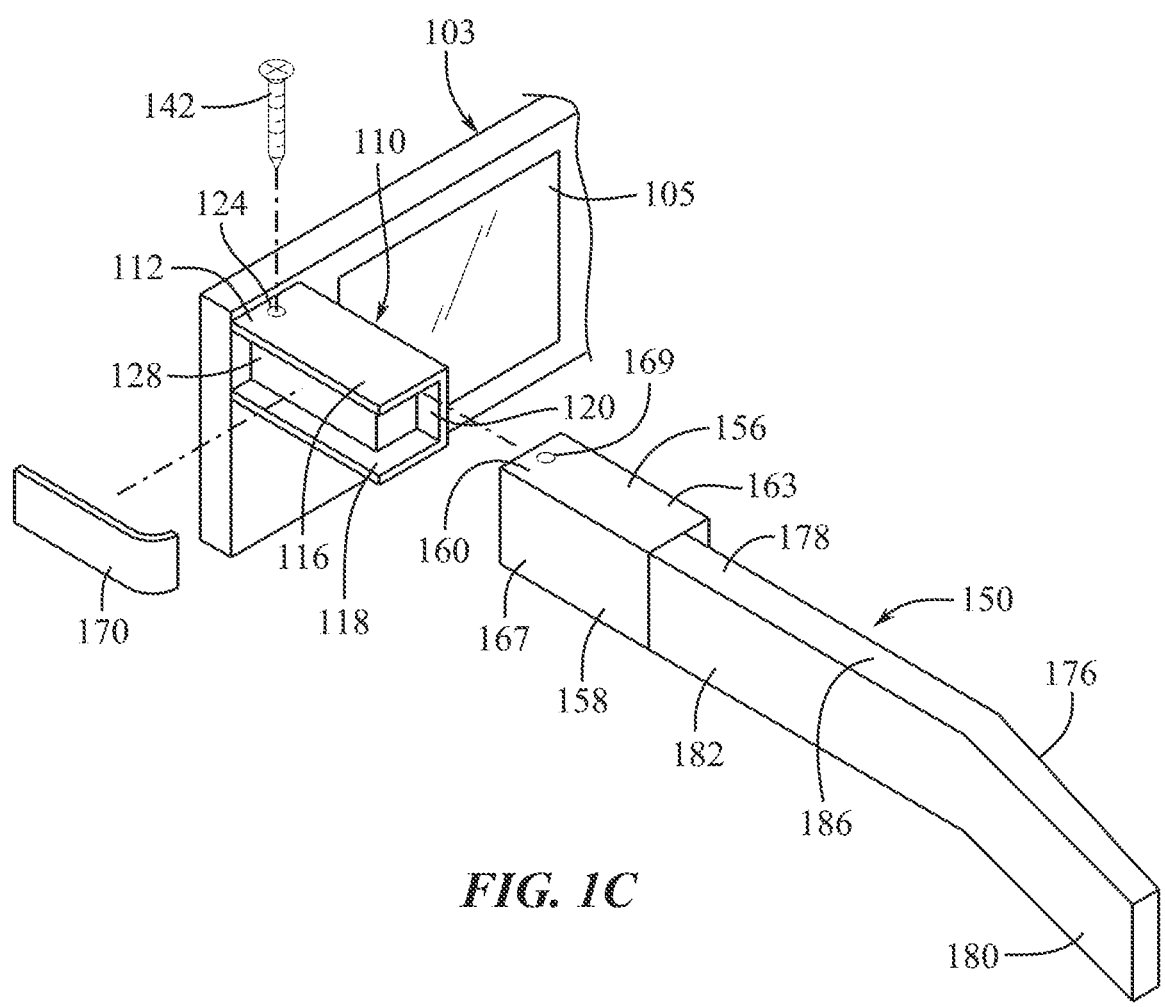
FIG. 1C shows a partial rear exploded view of the example of the head mountable electronic device of FIG. 1A.

FIG. 1C illustrates an exploded view of a portion of the example head mountable device 100 described above. The head mountable device 100 can include the display frame 103, the electronics housing 110, and securement arms 150. The head mountable device 100 can include a flexible member 170, which can be a biasing member 170.

As described above, the electronics housing 110 can include or connect with an electronics component 128. The electronics housing 110 can include one or more walls to secure or contain the electronic components 128. For example, the electronics housing 110 can include a top wall or side 116. The electronics housing 110 can include a bottom wall 118 opposite the top wall 116. In some examples, the top wall 116 or the bottom wall 118 can define connection apertures 124. The connection apertures 124 can be located at the proximal end 112 of the electronics housing 110. The connection apertures 124 can receive the fastener or pin 142 of the joint 140. The electronics housing 110 can include an interior side or wall 120. The interior wall 120 can extend between the top wall 116 and the bottom wall 118 and be oriented on the side towards the viewing window 105. As shown in FIG. 1A, the interior wall 120 can permit access to or expose a portion of the electronics components 128. The electronics housing 110 can include an exterior side 122 opposite the interior wall 120 that may not include a wall. Because the securement arm 150 can cover the exterior side 122, the exterior side 122 can be defined without a wall to reduce the width of the combined electronics housing 110 and the securement arms 150.

Figure 1D:
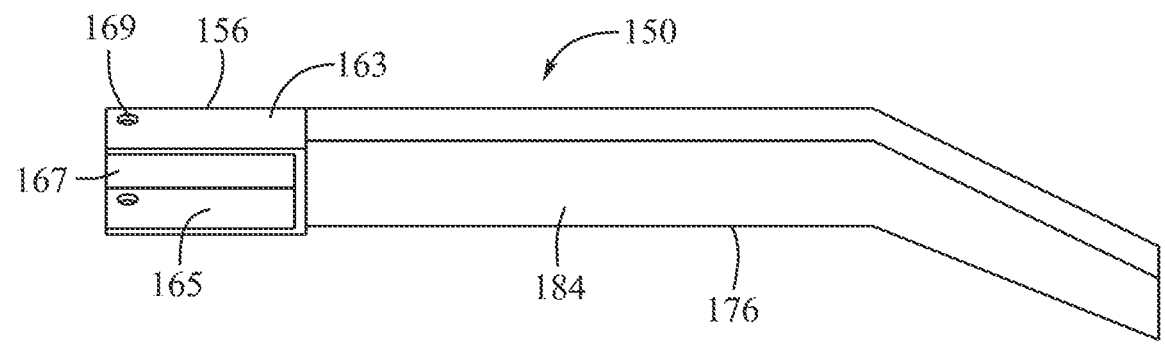
FIG. 1D shows a side view of an example securement arm of the head mountable electronic device of FIG. 1A.

With reference to FIGS. 1C and 1D, showing an example of securement arm 150, the securement arms 150 can include the hinge segment 156 and the elongated member 176 extending distally from the hinge segment 156. The hinge segment 156 can define or include one or more beams to cover or engage with the electronics housing 110. The beams can extend along or define one or more sides of the hinge segment 156. For example, the hinge segment 156 can include a top beam 163. The hinge segment 156 can include a bottom beam 165 opposite the top beam 163. The hinge segment 156 can include an exterior beam 167. The exterior beam 167 can extend between the top beam 163 and the bottom beam 165. The exterior beam 167 can be arranged to a side of the securement arm 150 opposite the viewing windows 105. In some examples, the beams can define apertures or features to engage with the joint 140. For example, the proximal end 160 of the top beam 163 and bottom beam 165 can define securement apertures 169 to receive the fastener or pin 142 of the joint 140.

The hinge segment 156 can define a first exterior arm surface 158. The elongated member 176 can define a second exterior arm surface 182. The elongated member 176 can define a top arm surface 186. As discussed above, the hinge segment 156 and the elongated member 176 can be arranged to create the appearance of a single arm piece. For example, the distal end 162 of the hinge segment 156 can abut the proximal end 178 of the elongated member 176. Accordingly, the hinge segment 156 and the elongated member 176 can be positioned to align the first exterior arm surface 158 and the second exterior arm surface 182. The top beam or side 163 of the hinge segment 156 and the top arm surface 186 can also align. For example, the transition between the hinge segment 156 and the elongated member 176 can be arranged to have minor changes in width or height, or be featureless. The alignment of the first exterior arm surface 158 and the second exterior arm surface 182 can create the appearance of a single continuous arm piece or surface, improving the aesthetics of the device 100. In one example, aligned surfaces are flush. In one example, aligned surfaces or adjacent components are coplanar and continuous from one surface or component to the other.

When coupled, the walls of the electronics housing 110 can be partially received or covered by the hinge segment 156 to create the appearance of a single arm rotating during adjustment of the securement arms 150. For example, the walls can be positioned between the beams or between the beams and the viewing window 105. For example, the top wall 116 can be at least partially positioned under the top beam 163 or between the top beam 163 and the bottom beam 165. The bottom wall 118 can be at least partially positioned under the bottom beam 165 or between the top beam 163 and the bottom beam 165. The interior wall 120 of the electronic housing can be exposed or otherwise uncovered to allow the projector 130 to generate an image displayed at the viewing window 105. Not covering the interior wall 120 can also reduce the combined width of the electronic housing 110 and the securement arm 150. The exterior beam 167 can extend between the top wall 116 and the bottom wall 118 on a side opposite the interior wall 120. Covering portions of the electronics housing 110 can also aid in protecting or sealing the electronic components 128.

In some examples, the head mountable device 100 can include an optional flexible member 170. The flexible member 170 can be connected or engaged with the electronic housing 110 and the securement arm 170. The flexible member 170 can be elastically deformable under a load. The flexible member 170 can be a spring, cantilever, or flexible beam. The flexible member 170 can be a feature arranged to bias or direct a position of the securement arm 150 relative to the electronic housing 110. For example, the flexible member 170 can bias the securement arm 150 inward to compress the securement arms 150 against the sides of a user's head. Accordingly, the flexible member 170 can be an inward deflecting cantilever or spring. In other examples, the flexible member 170 can bias the securement arms 150 outward. The flexible member 170 can also assist in limiting the splay angle 144 to prevent damage. The flexible member 170 can be positioned between the electronic housing 110 and the hinge segment 156. In some examples, the flexible member 170 can be positioned on the exterior of either or both the electronic housing 110 and the hinge segment 156. As shown in FIG. 1C, the flexible member 170 can be a cantilever engaged with the electronic housing 110 and the hinge segment 156 to bias the securement arm 150 inward. The flexible member 170 can be engaged with the interior of the exterior beam 167 to hide or cover the flexible member 170 similar to the electronic housing 110.

Figure 1E:
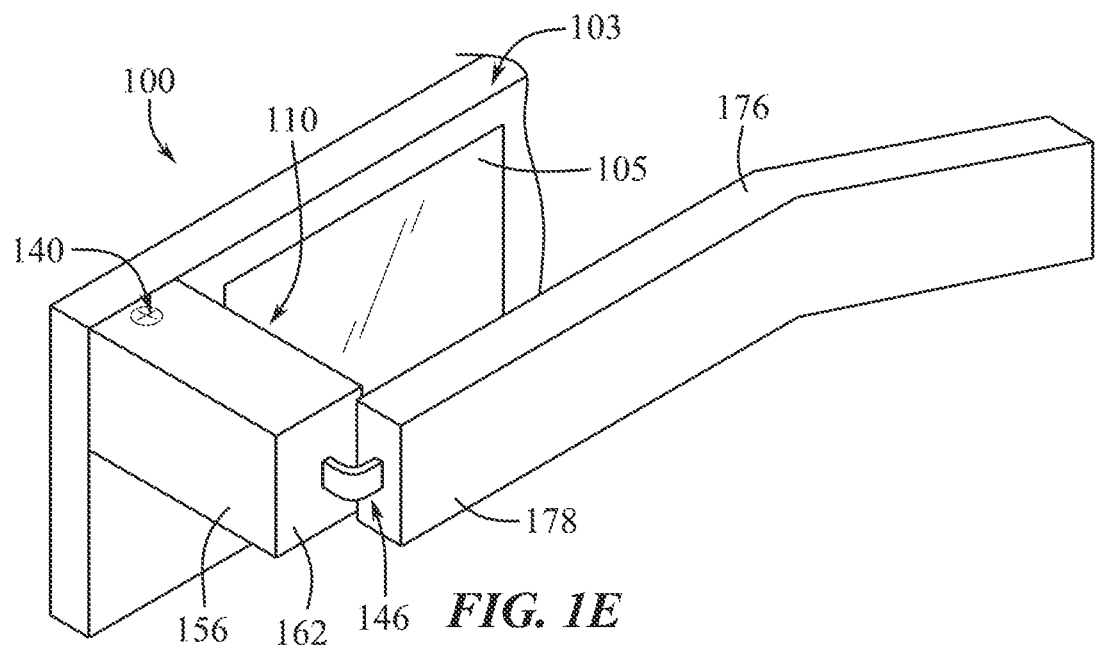
FIG. 1E shows a partial rear perspective view of the example head mountable electronic device of FIG. 1A in a folded configuration.

FIG. 1E illustrates a folded or storage configuration of the example head mountable device 100 as described. The device 100 can include an inward rotating or second joint 146. The second joint 146 can be positioned between the hinge segment 156 and the elongated member 176. In some examples, the second joint 146 can be a connection between a portion of the securement arm 150 and the electronics housing 110. The second joint 146 can be distally spaced from the first joint 140.

As shown in FIG. 1E, the second joint 146 can rotatably connect the hinge segment 156 and the elongated member 176. The second joint 146 can define a connection between the distal end 162 of the hinge segment 156 and the proximal end 178 of the elongated member 176. The second joint 146 can allow rotation of the elongated member 176 such that the inner surface 184 of the elongated member 176 (shown in FIG. 1D) is in a facing relationship with the viewing window 105 of the display frame 103. In the folded configuration the device 100 can have a reduced area allowing the device 100 to be stored in a case, pocket, or other location. The second joint 146 can be positioned such that the elongated member 176 rotates distal to the electronics housing 110. Accordingly, the electronic components 128 position relative to the viewing window 105 is maintained in the folded configuration during rotation of the elongated member 176 about the second joint 146.

Any of the features, components, and/or parts, including the arrangements and configurations thereof shown in any one of FIG. 1A-1E can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1A-1E.

Figure 2A:
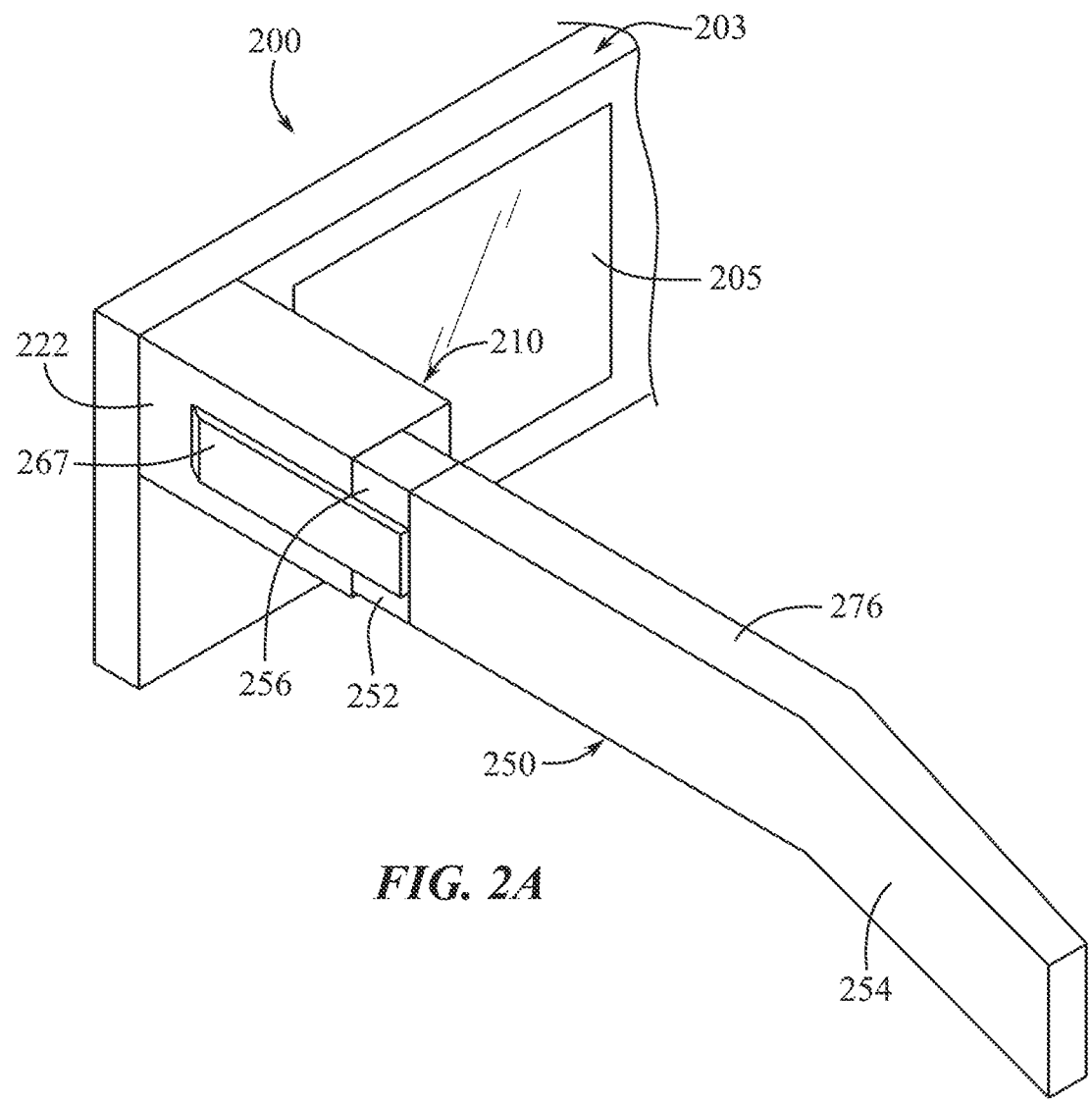
FIG. 2A shows a top perspective view of an example of a head mountable electronic device.

FIG. 2A illustrates another example of an optical electronic or head mountable device 200. The optical electronic device 200 can include the same or similar features or functions as the head mountable device 100. For example, the optical electronic device 200 can include a viewing frame 203 similar to the display frame 103. The optical electronic device 200 can include a fixed housing or portion 210 extending from the display frame 203 similar to the electronic housing 110. A securement arm 250 can couple to and extend distally from the viewing frame 203 or the fixed portion 210. The securement arm 250 can include proximal portion 252 including a hinge or bracket segment 256. The securement arm 250 can include distal portion 254 including an elongated member 276 extending distally from the bracket segment 256.

Figure 2B:
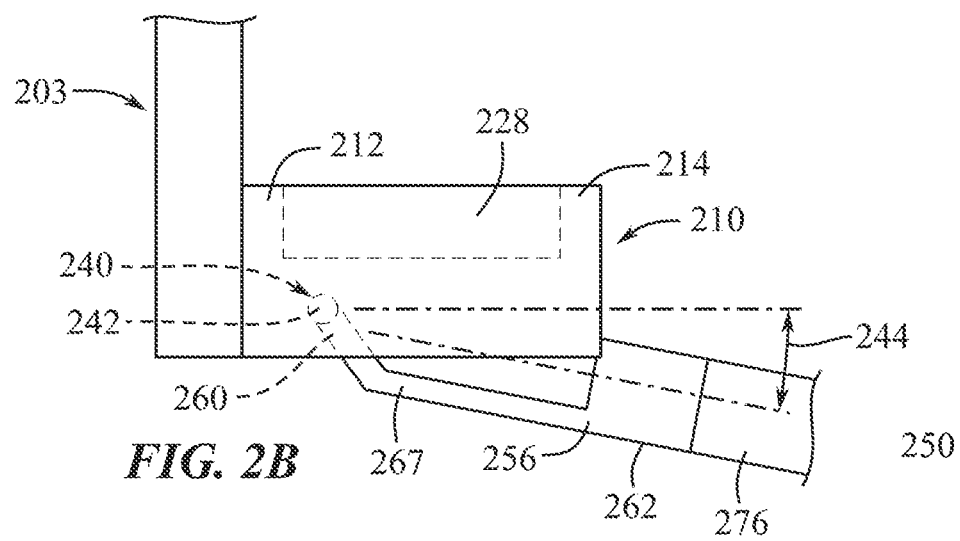
FIG. 2B shows a partial plan view of the example head mountable electronic device of FIG. 2A.

With reference to FIGS. 2A and 2B, showing a top view of the example optical electronic device 200. The securement arms 250 can include the bracket segment 256 covering or extending along a single side of the fixed portion 210. By extending along a single side of the fixed portion 210, the combined height or width of the fixed portion 210 and the securement arms 250 can be reduced or limited. The reduced height or width can be more aesthetically appealing. In this example, the bracket segment 256 can extend along an exterior side 222 of the fixed portion 210 to cover or hide the fixed portion 210.

Similar to the example described above, the fixed portion 210 can be coupled to or extend distally from the display frame 203. The fixed portion 210 can store or include one or more electrical components 228 such as speakers, projectors, lights, or other components. The fixed portion 210 can have a proximal end 212 adjacent the display frame 207 and a distal end 214 opposite the proximal end 212.

The bracket segment 256 can include one more beams. For example, the bracket segment 256 can include an exterior beam 267. The exterior beam 267 can extend between a distal end 262 of the bracket segment 256 and the proximal end of the bracket segment 256. The exterior beam 267 can include a curve or inflection point. For example, a portion of the beam 267 can extend inward. The proximal end 260 of the exterior beam 267, or the proximal end 260 of the bracket segment 256, can define a pivot 242. The pivot 242 can be a feature having a circular cross section or otherwise arranged to facilitate rotation of the securement arm 250.

The securement arms 250 can be coupled to the fixed portion 210 or the display frame 203 at the first joint 240. The first joint 140 can be located towards the proximal end 212 of the fixed portion 210 and adjacent the display frame 203. The exterior beam 267 can extend along or partially cover an outer side 222 of the fixed portion 210, opposite the display window 205 of the display frame 203. The exterior beam 267 can extend from the first joint 240 to the distal end 214 of the bracket segment 256. In some examples, the first joint 240 can defined by the connection between the fixed portion 210 and the bracket segment 256. For example, the fixed portion 210 can define an aperture or recess to receive the pivot 242. The pivot 242 can be movable in the aperture or recess to allow rotation of the securement arm 250 relative to the fixed portion 210. The change in position from an initial configuration of the securement arm 250 to the rotated position can define a splay angle 244. The curve of the beam 267 can allow the distal end 262 of the bracket segment 256 to rotatably position distal to the distal end 214 of the fixed portion 210.

By positioning the beam 267 along the outer side 222 of the fixed portion 210, the bracket segment 256 can cover the fixed portion 210 or create the appearance of both the fixed portion 210 and the securement arm 250 rotating at a point adjacent the display frame 203. Rotating at a point adjacent the display frame 203 can be aesthetically appealing. Using a single segment of the beam 267 along the outer side 222 of the fixed portion 210 can also limit or reduce a combined height of the fixed portion 210 and the securement arms 250. Further, the fixed portion 210 and the electrical components 228 can maintain a fixed position relative to the display window 205.

Any of the features, components, and/or parts, including the arrangements and configurations thereof shown in FIG. 2A or 2B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2A or 2B.

Figures 3A, 3B:
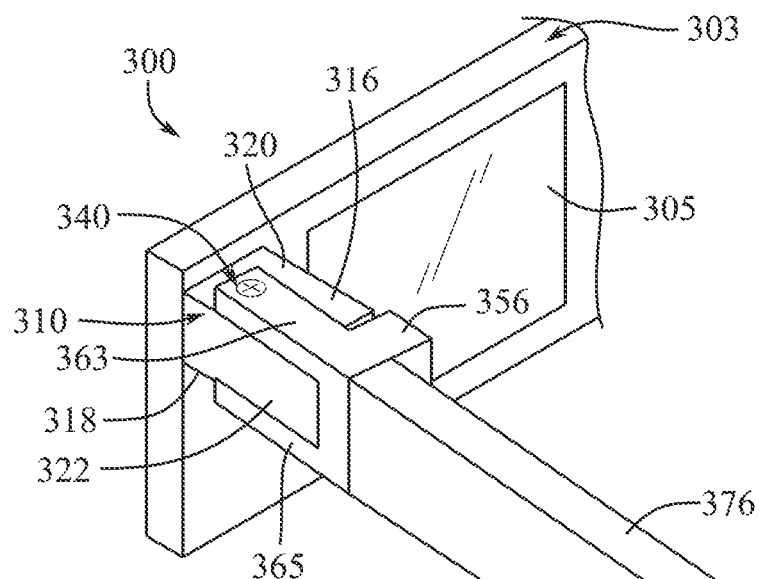
FIG. 3A shows a top perspective view of an example of a head mountable electronic device.
FIG. 3B shows a partial rear exploded view of the example of the head mountable electronic device of FIG. 3B.

FIG. 3A illustrates a perspective view of an example head mountable device 300. The head mountable device 300 can be the same or similar to the head mountable devices 100 or 200. For example, the head mountable device 300 can include a display frame 303. The display frame 303 can include one or more display windows or transparent viewing windows 305.

A fixed portion 310 can couple to or extend distally from the display frame 303. The fixed portion 310 can have a constant or defined positional relationship relative to the transparent windows 305. The fixed portion 310 can include one or more electrical components such as a projector, speaker, or other component. The fixed portion 310 can have a top side 316 and a bottom side 318 opposite the top side 316. The fixed portion 310 can have an interior side 320 facing towards the transparent windows 305 and extending between the top side 316 and the bottom side. The fixed portion can have an exterior side 322 opposite the interior side 320. The fixed portion can define a connection aperture 324 extending between the top side 316 and the bottom side 318.

The head mountable device 300 can include two or more securement arms 350. The securement arms 350 of the head mountable device 300 can be arranged to cover or extend along two or more sides of the fixed portion 310. The securement arms 350 can include a bracket segment 356 and an elongated member 376. The elongated member 376 can extend distally from the bracket segment 356. The bracket segment 356 can include one or more beams. The beams can be spaced from one another. For example, the bracket segment can include a top beam 363 and a bottom beam 365 spaced from the top beam 363 and extending from a side opposite the top beam 363. The top beam 363 and the bottom beam 365 can define corresponding securement apertures 369.

The securement arms 350 can rotatably couple to the fixed portions 310 at the first joint 340. The joint 340 can be located adjacent the display frame 303. The top beam 363 can extend over the top side 316 of the fixed portion to align the securement apertures 369 and the connection apertures 324. The bottom beam 365 can extend over the bottom side 318 of the fixed portion to align the securement apertures 369 and the connection apertures 324. The first joint 340 can include a fastener 342 such as a rod, pin, or screw to define a pivot for the securement arms 350 to rotate relative to the fixed portion 310. The fastener 342 can extend through or into the apertures 324, 369. By extending only along the top side 316 and the bottom side 318, the combined width of the securement arms 350 and fixed portion 310 can be reduced, which can be more aesthetically appealing. The reduced or limited width can also prevent the securement arms 350 or fixed portion 310 from contacting with the user's temples, which can be sensitive to contact or pressure from the device 350. Further, the placement of joint 340 adjacent the display frame 303 can provide the appearance of a singular arm extending from the joint 340, which can be aesthetically appealing.

The head mountable device 300 can optionally include one or more deflectors. The deflectors can be made from elastic materials. The deflectors can be engaged with the fixed portion 310 and the securement arms 350. The deflectors can be located at or adjacent the joint 340. In some examples, the deflectors can include a spring 372, such as a torsional spring. For example, the spring 372 can be operatively coupled to the fastener 342 to facilitate rotation about the fastener 342. The spring 372 can be located within the fixed portion 310 or between the fixed portion 310 and the securement arms 350. In some examples, deflectors can include a cantilever or leaf spring 374. The leaf spring 374 can extend between the fixed portion 310 and the bracket segment 356. The fixed portion 310 can define a recess or opening 336 to receive a portion of the leaf spring 374 to limit the visibility of the leaf spring 374. The deflectors can bias or direct the securement arms 350 to a position relative the display frame 303 or the fixed portion 310. The deflectors can deflect the securement arms 350 inward to generate a compressive force to secure the securement arms 350 to the side of a user's head.

Any of the features, components, and/or parts, including the arrangements and configurations thereof shown in FIG. 3A or 3B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3A or 3B.

Figure 4A:
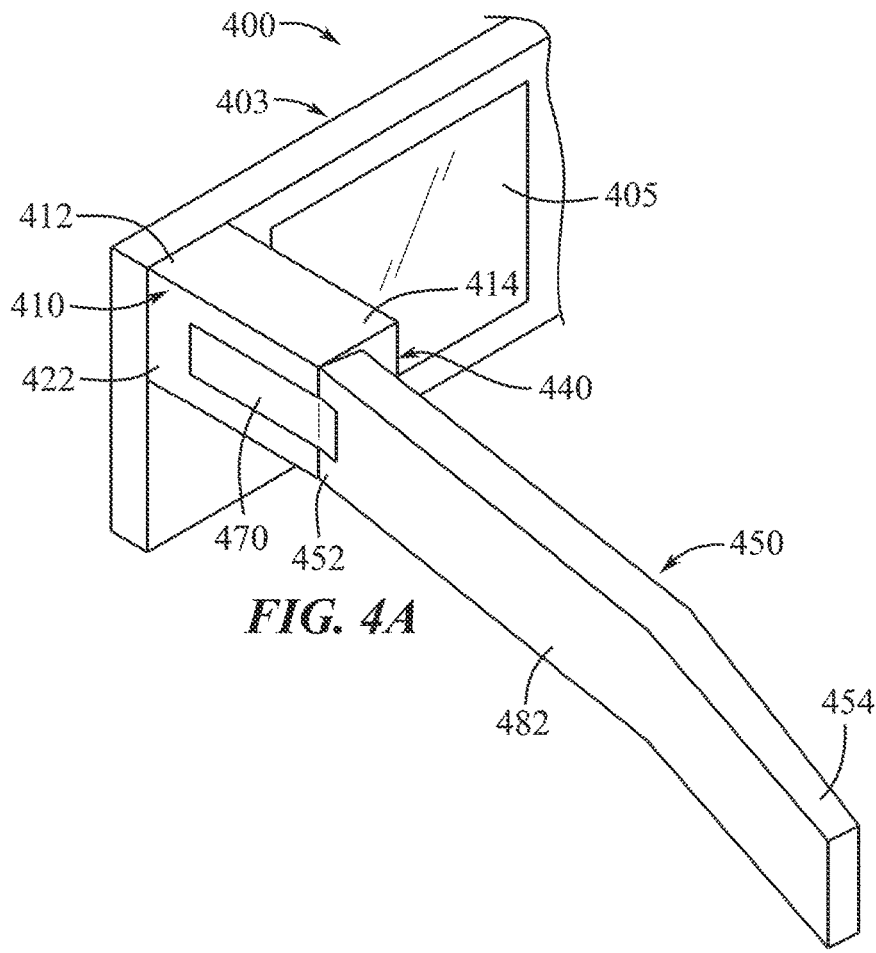
FIG. 4A shows a top perspective view of an example of a head mountable electronic device.
Figure 4B:
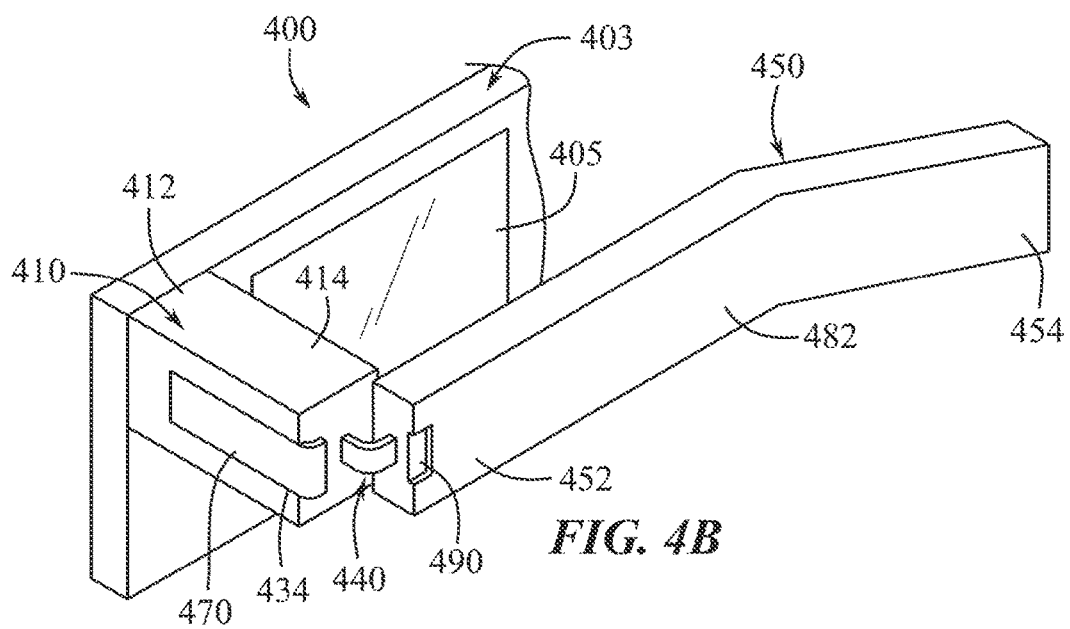
FIG. 4B shows a partial rear perspective view of the example head mountable electronic device of FIG. 4A in a folded configuration.

FIGS. 4A and 4B illustrate perspective views of an example optical electronic device 400. The head mountable device 400 can be the same or similar to the head mountable devices 100, 200, or 300. For example, the optical electronic device 400 can include a viewing frame 403. The viewing frame 403 can include one or more display windows 405. Two or more electronic housings 410 can connect to or extending distally from the viewing frame 403. The electronic housing 410 can be fixed or maintain a constant relationship relative to the viewing frame and display windows 405. Two or more securement arms 450 can couple to or engage with the electronic housing 410.

The electronic housing 410 can store or retain one or more electronic components, as described above, such as a projector or waveguide, speakers, or various other electronic items. The electronic components can require a fixed or constant relationship relative to features of the device 400, such as the display windows 405. The electronic housing 410 can have a proximal end 412 extending from or coupled to the display frame 403. The electronic housing 410 can have a distal end 414, distally spaced from opposite the proximal end 412. The electronic housing 410 can have an outer side 422 defined as the side opposite the display windows 405. The outer side 422 can include or define a recess 434. The recess 434 can proximally extend from the distal end 414 along the outer side 422.

The securement arms 450 can include a proximal portion 452 and a distal portion 454 opposite the proximal portion 452. The securement arms 450 can have an outer surface 482 oriented opposite the display windows 405. The outer surface 483 can define an arm recess 490 at or along the proximal portion 452.

The securement arms 450 can couple to the electronic housing 410 at a joint 440. The proximal portion 452 of the securement arms 450 can couple to the electronic housing 410. In one example, the proximal portion 452 can couple to the distal end 414 of the electronic housing 410. The joint 440 can allow rotation of the securement arm 450 outward, as in FIG. 4A, or inward, as in FIG. 4B, relative to the electronic housing 410. Accordingly, the joint 440 can allow the securement arm 450 to adjust to a user's head width or fold for storage. In the extended configuration, the arm recess 490 and the housing recess 434 can align to define a single recess.

In some examples, the optical electronic device 400 can include a flexible member 470. The flexible member 470 can be an elastic or elastically deformable material. The flexible member 470 can be positioned in the housing recess 434. The flexible member 470 extends over a joint. For example, the flexible member 470 can extend over the joint 440 from the housing recess 434 to the arm recess 490. The flexible member 470 can be attached to the electronic housing 410 or the securement arm 450. In one example, the flexible member 470 is attached to the electronic housing 410 and slidably engaged with the arm 450 at the arm recess 490. The flexible member 470 can assist to bias or direct the securement arm 450 inward relative to the electronic housing 410 to assist in securing the securement arms 450 against the side of a user's head. For example, as the securement arm 450 rotates outward relative to the electronic housing 410, the flexible member 470 can contact or slide into the arm recess 490. The flexible member 470 can flex to allow rotation of the securement arm 450 while also resisting rotation to compress the securement arms 450 against a user's head.

The flexible member 470 can also facilitate the appearance of a single arm extending between the display frame 403 and the distal portion 454 of the securement arm 450. The flexible member 470 can partially hide or conceal the joint 440, such as along the outer surfaces 422 and 482, or reduce the appearance of an angle between the securement arm 450 and the electronic housing 410. The flexible member can also be placed in the housing recess 434 and arm recess 490 to reduce a width of the combined housing 410 and arms 450. The appearances facilitated by the flexible member 470 can be more aesthetically appealing to users.

Any of the features, components, and/or parts, including the arrangements and configurations thereof shown in FIG. 4A or 4B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4A or 4B.

To the extent applicable to the present technology, gathering and use of data available from various sources can be used to improve the delivery to users of invitational content or any other content that can be of interest to them. The present disclosure contemplates that in some instances, this gathered data can include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data can be used to provide insights into a user's general wellness, or can be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data can be governed by federal and/or state laws, such as the Health Insurance Portability and Accountability Act (HIPAA); whereas health data in other countries can be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user can be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification can be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A head mountable electronic device, comprising:
   a display frame;
   a display window secured to the display frame;
   a fixed portion extending distally from the display frame, the fixed portion including:
      a proximal end adjacent the display window;
      a distal end opposite the proximal end; and
      an electronic component; and
   a securement arm, the securement arm comprising:
      a hinge segment rotatably coupling the securement arm with the proximal end of the fixed portion; and
      an elongated member extending distally from the hinge.

2. The head mountable electronic device of claim 1, wherein the electronic component comprises a projector.

3. The head mountable electronic device of claim 2, wherein the projector is positionally fixed relative to the display window.

4. The head mountable electronic device of claim 1, wherein:
   the head mountable electronic device further comprises:
      a first joint defining a connection between the fixed portion and the hinge segment; and
      a biasing member, wherein:
      the biasing member comprises a torsion spring, and
      the biasing member is engaged with the hinge segment and the fixed portion at the first joint.

5. The head mountable electronic device of claim 1, further comprising:
   a first joint defining a connection between the fixed portion and the hinge segment; and
   a biasing member comprising a cantilever, the biasing member engaged with the hinge segment and the fixed portion at the first joint.

6. The head mountable electronic device of claim 5, further comprising a second joint rotatably connecting the elongated member and the hinge segment.

7. The head mountable electronic device of claim 1, wherein:
   the hinge segment comprises a first exterior arm surface;
   the elongated member comprises a second exterior arm surface; and
   the hinge segment and the elongated member abut to align the first exterior arm surface and the second exterior arm surface.

8. An optical electronic device, comprising:
   a frame comprising a transparent window;
   a fixed portion extending from the frame, the fixed portion defining a connection aperture and including a waveguide configured to direct light to the transparent window;
   a securement arm extending distally from the frame, the securement arm comprising:
      a bracket segment rotatably engaged with the fixed portion at the connection aperture and extending along a length of the fixed portion; and
      an elongated member rotatably coupled to the bracket segment; and
   a deflector engaged with the bracket segment and the fixed portion.

9. The optical electronic device of claim 8, wherein:
   the fixed portion comprises:
      a top side; and
      a bottom side opposite the top side;
   the bracket segment comprises a beam; and
   the beam extends along a portion of the top side and the bottom side.

10. The optical electronic device of claim 8, wherein:
    the fixed portion comprises:
       an interior side adjacent a display window, and
       an exterior side opposite the interior side;
    the bracket comprises a beam; and
    the beam covers a portion of the exterior side of the fixed portion.

11. The optical electronic device of claim 8, wherein:
    the fixed portion comprises:
       a top side;
       a bottom side opposite the top side;
       an interior side adjacent the display window; and
       an exterior side opposite the interior side;
    the bracket segment comprises a beam; and
    the beam covers a portion of the exterior side, the top side, and the bottom side.

12. The optical electronic device of claim 8, wherein:
    the optical electronic device comprises a fastener;

the bracket defines a securement aperture aligned with the connection aperture; and the fastener couples the bracket and the fixed portion at the connection aperture and the securement aperture.

13. The optical electronic device of claim 12, wherein the fastener defines a rotatable pivot.

14. An electronic device, comprising:
a frame:
a viewing window secured to the frame;
an electronic housing portion, the electronic housing portion comprising a projector fixed within the electronic housing portion;
a securement arm rotatably extending distally to the electronic housing portion, the securement arm comprising:
   a proximal portion rotatably engaged with the electronic housing portion at a joint; and
   a distal portion opposite the proximal portion; and
a flexible member coupled to the electronic housing portion and engaged with the securement arm.

15. The electronic device of claim 14, wherein:
the electronic housing portion comprises:
   a proximal end extending from the frame; and
   a distal end opposite the proximal end; and
the proximal portion is coupled to the distal end at the joint.

16. The electronic device of claim 14, wherein:
the electronic housing portion comprises an exterior side opposite the viewing window; and
the flexible member extends across the joint, along a length of the exterior side of the electronic housing portion, and along a length of the proximal portion of the securement arm.

17. The electronic device of claim 14, wherein:
the electronic housing portion comprises:
   a proximal end extending from the frame; and
   a distal end opposite the proximal end; and
the proximal portion of the securement arm is coupled to the proximal end.

18. The electronic device of claim 14, wherein the flexible member comprises an inward deflecting cantilever.

19. The electronic device of claim 14, wherein the flexible member comprises an inward deflecting spring.

20. The electronic device of claim 14, wherein:
the electronic housing portion comprises:
   an exterior side opposite the viewing window; and
   a recess defined by the exterior side; and
the flexible member is positioned in the recess.

\* \* \* \* \*